Patented Dec. 29, 1936

2,065,849

UNITED STATES PATENT OFFICE 2,065,849

GERMICIDAL PREPARATIONS

Carl N. Andersen, Wellesley Hills, Mass., assignor to Lever Brothers Company, a corporation of Maine No Drawing. Application February 5, 1936, Serial No. 62,461

11 Claims. (Cl. 167—71)

The present invention relates to germicidal preparations comprising organic mercury compounds.

It is an object of my invention to produce a germicidal preparation, and more particularly a preparation containing an organic mercury derivative of a boron oxy compound, which has sufficient germicidal potency for the destruction of bacteria and at the same time has a sufficiently low toxicity to permit its use in connection with human beings and other higher inmals.

I have discovered that when the boric acids or salts thereof are reacted with certain aromatic mercury compounds, compounds are produced which have an extraordinarily high potency as germicides and at the same time are characterized by relatively low toxicity and other desirable properties.

The compounds I have employed may in general be represented by the formula $(RHg)_x.R_1$, in which R represents an aromatic structure to a carbon atom of which the mercury is directly attached; in which $x$ is an integer representing the number of RHg groups in the compound; and in which $R_1$ represents a radical of a boric acid or boron oxy compound. While the word "group" is used hereinafter it will be understood that it must be interpreted as plural when the value of $x$ is more than one.

I believe these compounds to be borates in which one or more of the acidic hydrogens of a boric acid have been replaced by the aromatic mercury radical. However, as explained hereinafter, it is very difficult to identify the compounds as to structure.

More particularly, R represents an aromatic structure, which may be an aromatic nucleus with or without side chains, and the expression "aromatic structure" used herein is intended to be generic and include an aromatic nucleus with or without side chains. The aromatic structure is the type in which none of the nuclear or side chain carbon atoms has direct linkage with any element other than hydrogen, carbon, or mercury. R may stand for the phenyl group, $C_6H_5$, or for an aromatic hydrocarbon having a nucleus similar to the phenyl hydrocarbons, as for example, mono or polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

$R_1$ represents a radical of any of the boric acids or oxy boron compounds.

Boron forms a series of oxy compounds which may be regarded as derivatives of boron trioxide, $B_2O_3$. When the boron trioxide unites with metallic oxides, a series of salts are formed, known as borates. The ratio between the metallic oxide and the boron oxide is variable and, therefore, an entire series of borates is obtainable.

When the boron trioxide unites with water, a boric acid is formed; the ratio between the boron oxide and water is also variable to form a series of boric acids.

Boric (ortho-boric) acid, $H_3BO_3$, $B(OH)_3$, or $3H_2O.B_2O_3$, is the most common form.

When ortho-boric acid is heated to 100° C., it slowly loses water, and becomes meta-boric acid $H_2B_2O_4$, $B_2O_2(OH)_2$, or $B_2O_3.H_2O$.

When either the ortho-boric or meta-boric acid is heated to 140° C. for a long time it loses water and becomes pyro-boric (tetra-boric) acid, $H_2B_4O_7$, $B_4O_5(OH)_2$ or $2B_2O_3.H_2O$.

When either the meta or pyro-boric acid is dissolved in water, it reverts to ortho-boric acid.

Perboric acid, $HBO_3$, and salts of boric acids of the formulae $H_4B_6O_{11}$ and $H_6B_8O_{15}$, are also known. Boric acid forms acids with certain metallic oxides; for example, borotungstic acid results from boric acid and tungstic oxide.

The above acids are illustrative of the compounds, radicals of which are represented by $R_1$, and it is, therefore, apparent that my invention includes all of the aromatic mercury derivatives of boron oxy compounds of the above defined type.

The borates as a general class of compounds separate out of a water solution with water of crystallization, and in most instances a compound may have different amounts of water of crystallization. If the compound is separated out of alcohol, it will usually be formed with alcohol of crystallization. The physical properties of the borates largely depend upon the water or alcohol of crystallization contained therein. Frequently a borate sinters and appears to partially melt at a low temperature; practically the water of crystallization is being driven off and the salt partially dissolves. At a higher temperature the water is expelled, and the material again solidifies. At still higher temperatures, the anhydrous material melts, and the melting point is usually not sharp.

The aromatic mercury borates I employ in the germicidal preparations of this invention, may also be formed with water or alcohol of crystallization, if either is present in the reacting solution or in the solution from which the borate is recrystallized. Due to variations in the proportions of water or alcohol present in the solution, and variations in other reacting conditions, the aromatic mercury borates may be formed with different amounts of water or alcohol of crystallization. This will affect their melting points. While many of the aromatic mercury borates appear to have a definite amount of water of crystallization, these materials, however, effloresce readily and tend to produce compounds which, on analysis, show a variation in the amount of water.

The identification of the borates is further complicated by the fact that boric acids may be regarded as essentially various combinations of boron oxide and water, and the borates may be regarded essentially as various combinations of boron oxide, metallic oxides and water. When the boric acids and borates are in solution it is possible that the water content in the compound may vary under different conditions, and a boric acid or a borate may shift from one form to another during a reaction, or more than one form of compound may exist simultaneously depending on the particular conditions.

Analysis of the compounds indicates that mercury and boron are present in the compounds in different ratios corresponding to different aromatic mercury borates. It is entirely possible, however, that small amounts of boron oxide or aromatic mercury hydroxide or water, in addition to the amounts represented by theoretical formulæ, may be present as a loose chemical addition compound or as a physically bound adsorption. For this reason, certain deviations from the ratio of the constituents may exist. However, these deviations are not of sufficient magnitude to be of importance.

The aromatic mercury borates when heated or dried at 100° C. or above for any considerable period of time have a tendency to decompose. For this reason it is difficult to ascertain the true melting point of the anhydrous compounds which have been prepared with water or alcohol of crystallization.

Due to these peculiar characteristics of the borates, it is difficult to identify the aromatic mercury borates solely by their melting points and to predict the physical characteristics of the compound which results from slightly different conditions in the reaction.

The apparent variety of the compounds is simplified when they are in solution and I find that all of the aromatic mercury borates have excellent germicidal properties.

A general method of preparing the aromatic mercury borates consists in reacting together the boric acid and a compound containing an aromatic mercury radical of the above mentioned type. A common solvent for both reacting components is employed. The compound resulting from the reaction is usually relatively insoluble and upon its separation from the solution, it may be filtered, washed and dried. One of the compounds I prefer to use is the aromatic mercury hydroxide. The reaction between the hydroxide and the boric acid is one of neutralization of an acid and base to form a salt and water. This has the advantage that water is the only other product produced and the resulting compound may be easily purified. I may also employ the soluble salts of boric acid, for example the alkali metal borates, in reaction in solution with the aromatic mercury hydroxide. Another general method of preparing the aromatic mercury compounds of this type consists in fusing together an aromatic mercury compound, such as phenylmercury acetate with an oxysalt of boron, for example, borax (sodium tetra-borate). The aromatic mercury borate resulting from the fusion is dissolved in hot water and the solution filtered. It is then crystallized from this solution. Any of these general methods may be employed in producing compounds employed in my germicidal preparation.

The reacting materials are generally employed in substantially theoretical quantities. The number of hydrogens in the boric acid which are replaced by the aromatic mercury radical in most instances will depend on the relative amounts of reacting components employed. In some cases the relative amounts may also be a factor in the determination of the particular borate resulting from the reaction.

The process may be carried out at any temperature, for example, room temperature. In most cases I find, however, that the use of heat assists in the solution of the reacting components and speeds the reaction.

Any suitable solvent in which the reacting components are soluble, and which does not enter into or modify the desired reaction, may be used as the medium in carrying out the process. Water is generally used for reasons of convenience when it is suitable for the desired reaction. Other solvents such as the alcohols, acetone or mixtures of these with each other or with water, may also be employed.

From the description of the following specific examples, it will be readily apparent to one skilled in the art how the compounds of the above identified group may be reacted with an aromatic mercury compound to produce aromatic mercury borates. These examples are given merely as illustrative of the method of preparing compounds and merely as illustrative of the generic group of compounds employed in the germicidal preparations.

*Example I*

35.28 grams of phenylmercury hydroxide is dissolved in 500 cc. of anhydrous alcohol and heated until solution is complete. To the solution is added 9.48 grams of pyro-boric acid dissolved in 500 cc. of alcohol. The mixture is heated and concentrated to about 200 cc., filtered and set aside to crystallize. The alcohol is decanted and a glassy gum remains. This is heated at a low temperature to expel the remaining alcohol. A brittle gray material remains. Upon heating the material it becomes vitreous and gives off a gas at 82–90° C.; at 135–175° C. it fuses and becomes clear; at 270° C. it develops a yellow color. The boron analysis confirms the compound as being the diphenylmercury pyroborate.

*Example II*

17.64 grams of phenylmercury hydroxide is dissolved in one-half liter of alcohol. The solution is filtered to remove any insoluble material. To the filtrate is added 2.64 grams of meta-boric acid dissolved in 50 cc. of alcohol. The mixture is heated and evaporated to a volume of about 200 cc. and allowed to crystallize. An amorphous solid remains which is separated and heated at a low temperature to evaporate the remaining alcohol. A grayish amorphous solid remains which has a melting point of 125–180° C. The boron content confirms the compound as being the diphenylmercury metaborate.

In the two previous examples alcohol is employed as a solvent in view of the fact that the meta and pyro boric acids revert to the ortho form in aqueous solution.

Example III 17.64 grams of phenylmercury hydroxide is dissolved in 4 liters of water and heated until solution is complete. The solution is filtered to remove any insoluble material. To the filtrate is added an aqueous solution containing 3.77 grams of ortho-boric acid. No precipitate results and the solution is evaporated to one-third of its original volume and allowed to cool. Crystals are formed and the mixture is filtered to separate the crystals which are washed and dried. Upon heating the material it was found to have a melting point of 180–190° C.; when the material is recrystallized from alcohol it has a melting point of 148–152° C. The mercury content indicates that the material is triphenylmercury ortho-borate.

Example IV 88.2 grams of phenylmercury hydroxide is dissolved in 2 liters of water and heated until solution is complete. The solution is filtered to remove any insoluble material. To the filtrate is added 6.9 grams of boric acid dissolved in 100 to 500 cc. of water. The solution is concentrated and allowed to stand over night. White crystals are formed which are separated by filtration, washed with 500 cc. of water and 300 cc. of alcohol. The compound has a melting point of 178–181° C. Upon recrystallization from alcohol the material has a melting point of 179–181.5° C.

Example V 88.2 grams of phenylmercury hydroxide is dissolved in 4 liters of water and heated until solution is complete. This is filtered into a 50–50 water and alcohol solution containing 6.9 grams of boric acid (ortho). The solution is evaporated to one-third its original volume and upon cooling crystals separate out which melt at 220–222° C. Upon recrystallization of this material from alcohol the material has a melting point of 171.5–180° C. An analysis of the recrystallized material shows it to be the triphenylmercury orthoborate.

The phenylmercury compound and the boric acid are employed in substantially the proportions of three mols of the phenylmercury compound to one mol of the boric acid which is the ratio requisite for the formation of triphenylmercury orthoborate. The originally precipitated material melting at 220–222° C. is impure and contains some phenylmercury hydroxide which is removed during recrystallization.

Example VI 700 grams of phenylmercury hydroxide is dissolved in 10 liters of alcohol. When solution is complete it is filtered into a 50–50 alcohol and water solution containing 80 grams of ortho boric acid. The mixture was stirred thoroughly and concentrated to one-third its original volume and allowed to cool. Upon standing over night a gummy material separated. Upon heating the material it softened and changed in physical appearance at 115–120° C. and upon further heating it melted at 138° C. An analysis of this compound shows it to be the diphenylmercury orthoborate. The lower melting point and the peculiar behavior in melting is probably due to alcohol of crystallization in the compound which would be expected to be present due to the fact that the compound is prepared in an alcohol solution.

Example VII 88.2 grams of phenylmercury hydroxide is dissolved in 4 liters of water and heated until solution is complete. To this is added 500 cc. of water containing 57 grams of sodium tetra-borate. The mixture is concentrated to one-half its original volume and allowed to cool. Crystals form which are separated by filtration and washed with water and alcohol and dried. The material softens at 185° C., fuses at 187° C. and completely melts at 198° C. When recrystallized out of alcohol the material softens at 162° C. and melts at 171–171.5° C. Analysis of the mercury content shows the compound to be diphenylmercury borate.

Example VIII 40 grams of phenylmercury hydroxide is dissolved in 2 liters of water and heated until solution is complete. To the solution is added 100 cc. of water containing 10 grams of boric acid. The solution is heated to concentrate the volume and it is then filtered and allowed to cool. White crystals form which are separated by filtration and recrystallized from alcohol. The material sinters at 103° C., and melts at 121–122° C. After the compound has lost its water by efflorescence, it has a melting point of 189° C. Mercury and boron analyses indicate that the material is the compound diphenylmercury borate.

Preparations comprising the aromatic mercury borates are characterized by extraordinarily high potency as germicides. Tests to determine the efficacy of some of them in killing *B. typhosus* and *Staph. aureus* were carried on under the following conditions:

Solutions of varying dilutions from 1:10,000 upward until killing ceased, were made up.

These dilutions were employed in the conduct of the tests, by the following methods:

Circular 198, U. S. Dept. of Agriculture, Dec. 1931, described as F. D. A. method against *Eberthella typhi* (typhoid bacillus) at 37° C. and F. D. A. Special Method against *Staph. aureus* at 37° C.

As illustrative of the potency of the compounds, the killing power of the following compounds is given merely as illustrative.

The figures represent the maximum dilutions at which killing in 15 minutes resulted:

|  | B. typhosus | Staph. aureus |
| --- | --- | --- |
| Triphenylmercury borate (aqueous) | 1: 80,000 | 1:60,000 |
| Triphenylmercury borate (alcohol) | 1:100,000 | 1:60,000 |

Preparations comprising the aromatic mercury borates are also characterized by relatively low toxicity. Because of this and their higher germicidal properties it makes it possible to use them in extreme dilutions. They may be used externally and locally in connection with a human being or other higher animals and in some cases administered internally with satisfactory results from the germicidal standpoint and without harmful effect to the body or its functions.

The preparations may be aqueous or other solutions of the compounds, or the compounds may

I claim:

1. A germicidal preparation of relatively low toxicity and adapted for use in suitable concentration in destroying bacteria in contact with tissue of a human being or other higher animal, comprising an aromatic mercury compound resulting from the reaction of a boron oxyacid with an aromatic mercury hydroxide of the kind in which the mercury is directly attached to the carbon atom of an aromatic structure in which none of the carbon atoms has direct linkage with any element other than carbon, hydrogen, and mercury.

2. A germicidal preparation of relatively low toxicity and adapted for use in suitable concentration in destroying bacteria in contact with tissue of a human being or other higher animal, comprising an organic compound of the general formula $(RHg)_x.R_1$, in which R represents an aromatic structure to a carbon atom of which the mercury is directly attached and in which none of the carbon atoms has direct linkage with any element other than carbon, hydrogen and mercury; in which $x$ represents the number of RHg groups in the compound; and in which $R_1$ represents an ortho-boric acid radical.

3. A germicidal preparation of relatively low toxicity and adapted for use in suitable concentration in destroying bacteria in contact with tissue of a human being or other higher animal, comprising an organic compound of the general formula $(RHg)_3.BO_3$, in which R represents an aromatic structure to a carbon atom of which the mercury is directly attached and in which none of the carbon atoms has direct linkage with any element other than carbon, hydrogen and mercury.

4. A germicidal preparation of relatively low toxicity and adapted for use in suitable concentration in destroying bacteria in contact with tissue of a human being or other higher animal, comprising an organic compound of the general formula $(RHg)_2.HBO_3$, in which R represents an aromatic structure to a carbon atom of which the mercury is directly attached and in which none of the carbon atoms has direct linkage with any element other than carbon, hydrogen and mercury.

5. A germicidal preparation of relatively low toxicity and adapted for use in suitable concentration in destroying bacteria in contact with tissue of a human being or other higher animal, comprising an organic compound of the general formula $(RHg)_x.R_1$, in which R represents an aromatic structure to a carbon atom of which the mercury is directly attached and in which none of the carbon atoms has direct linkage with an element other than carbon, hydrogen and mercury; in which $x$ represents the number of RHg groups in the compound; and in which $R_1$ represents a pyro-boric acid radical.

6. A germicidal preparation of relatively low toxicity and adapted for use in suitable concentration in destroying bacteria in contact with tissue of a human being or other higher animal, comprising a phenylmercury compound resulting from the reaction of a boron oxyacid with phenylmercury hydroxide.

7. A germicidal preparation of relatively low toxicity and adapted for use in suitable concentration in destroying bacteria in contact with tissue of a human being or other higher animal, comprising a phenylmercury ortho-borate.

8. A germicidal preparation of relatively low toxicity and adapted for use in suitable concentration in destroying bacteria in contact with tissue of a human being or other higher animal, comprising triphenylmercury ortho-borate.

9. A germicidal preparation of relatively low toxicity and adapted for use in suitable concentration in destroying bacteria in contact with tissue of a human being or other higher animal, comprising diphenylmercury ortho-borate.

10. A germicidal preparation of relatively low toxicity and adapted for use in suitable concentration in destroying bacteria in contact with tissue of a human being or other higher animal, comprising a phenylmercury pyro-borate.

11. A germicidal preparation of relatively low toxicity and adapted for use in suitable concentration in destroying bacteria in contact with tissue of a human being or other higher animal, comprising diphenylmercury pyro-borate.

CARL N. ANDERSEN

CERTIFICATE OF CORRECTION.

Patent No. 2,065,849.  December 29, 1936.

CARL N. ANDERSEN.

It is hereby certified that error appears in the printed specification of the above numbered patent requiring correction as follows; Page 3, first column, line 1, for "125-180°C." read 175-180°C.; and that the said Letters Patent should be read with this correction therein that the same may conform to the record of the case in the Patent Office.

Signed and sealed this 23rd day of February, A.D. 1937.

(Seal)

Henry Van Arsdale
Acting Commissioner of Patents.